(12) United States Patent
Strahan et al.

(10) Patent No.: US 9,399,375 B2
(45) Date of Patent: Jul. 26, 2016

(54) REDUCED POWER CONSUMPTION METHOD FOR SAMPLING PARAMETERS WITHIN A TPMS

(71) Applicant: Schrader Electronics Limited, Antrim (GB)

(72) Inventors: Samuel Strahan, Ballymena (GB); Gary Smith, Swindon (GB)

(73) Assignee: Schrader Electronics Limited, Antrim (GB)

( * ) Notice: Subject to any disclaimer, the term of this patent is extended or adjusted under 35 U.S.C. 154(b) by 0 days.

(21) Appl. No.: 14/357,521

(22) PCT Filed: Nov. 13, 2012

(86) PCT No.: PCT/EP2012/072527
§ 371 (c)(1),
(2) Date: May 9, 2014

(87) PCT Pub. No.: WO2013/072324
PCT Pub. Date: May 23, 2013

(65) Prior Publication Data
US 2014/0300460 A1    Oct. 9, 2014

(30) Foreign Application Priority Data

Nov. 15, 2011 (GB) .................................. 1119711.8

(51) Int. Cl.
*B60C 23/00* (2006.01)
*B60C 23/04* (2006.01)
*G01L 17/00* (2006.01)

(52) U.S. Cl.
CPC ............. *B60C 23/04* (2013.01); *B60C 23/0474* (2013.01); *G01L 17/00* (2013.01)

(58) Field of Classification Search
CPC ............ B60C 23/0408–23/0484; B60C 23/04; G01L 17/00
USPC ............ 340/442–448; 73/146.2, 146.4, 146.5
See application file for complete search history.

(56) References Cited

U.S. PATENT DOCUMENTS

| 2003/0197603 | A1 | 10/2003 | Stewart et al. |
| 2005/0229691 | A1 | 10/2005 | Shaw et al. |
| 2006/0232391 | A1* | 10/2006 | Nakatani et al. .............. 340/447 |
| 2012/0112899 | A1* | 5/2012 | Hannon ........................ 340/445 |

* cited by examiner

*Primary Examiner* — Thomas Mullen

(57) ABSTRACT

An apparatus for measuring parameter values from an electrical input signal comprises a signal sampling device operable to sample the input signal and to produce a corresponding output comprising a measured parameter value; a signal level detector configured to detect changes in the level of the input signal by more than a threshold amount; and a controller co-operable with the signal sampling device and the signal level detector. The controller is configured to operate the signal sampling device to sample the input signal in response to the signal level detector detecting a change in the input signal level by more than the threshold amount.

26 Claims, 4 Drawing Sheets

REDUCED POWER CONSUMPTION METHOD FOR SAMPLING PARAMETERS WITHIN A TPMS

CROSS REFERENCE TO RELATED APPLICATIONS

This application is a US National stage of pending application PCT/EP2012/072527, filed Nov. 13, 2012, entitled "LOW POWER SAMPLING APPARATUS FOR A TIRE PRESSURE MONITORING SYSTEM", which claims priority from pending Patent Application No. 1119711.8, filed Nov. 15, 2011, entitled "TYRE PRESSURE MONITORING APPARATUS" which are hereby incorporated by reference, as if set forth in full in this document, for all purposes.

FIELD OF THE INVENTION

The present invention relates to sampling apparatus for electrical signals. The invention relates particularly to wheel monitoring systems, especially Tyre Pressure Monitoring Systems (TPMS). The invention has particular application in measuring parameter values from electrical signals emanating from wheel mounted units of a TPMS.

BACKGROUND TO THE INVENTION

Systems have been developed for monitoring characteristics, such as tyre pressure, tyre (air) temperature and/or acceleration of the wheels of a vehicle, or the battery voltage of a battery in a wheel mounted unit. A wheel mounted unit comprising one or more appropriate sensor(s) is located at each wheel, typically inside the tyre, which measures the relevant characteristic(s) and transmits corresponding information to a remote central monitoring station.

New wheel mounted units for tyre pressure monitoring systems (TPMS) are moving to smaller battery sizes which means that power management becomes a critical parameter in the design.

It would be desirable therefore to reduce the power consumption requirements of wheel mounted sensor units, particularly during measurement cycles.

SUMMARY OF THE INVENTION

A first aspect of the invention provides an apparatus for measuring parameter values from an electrical input signal, the apparatus comprising a signal sampling device operable to sample said input signal and to produce a corresponding output comprising a measured parameter value;

a signal level detector configured to detect changes in the level of said input signal by more than a threshold amount; and a controller co-operable with said signal sampling device and said signal level detector and being configured to operate said signal sampling device to sample said input signal in response to said signal level detector detecting a change in said input signal level by more than said threshold amount.

A second aspect of the invention provides a tyre monitoring apparatus comprising the apparatus of the first aspect of the invention.

A third aspect of the invention provides a tyre monitoring system comprising at least one wheel mountable unit and a separate controller with which said at least one wheel mountable unit is capable of communicating, wherein said at least one wheel mountable unit comprises the tyre monitoring apparatus of the second aspect of the invention.

A fourth aspect of the invention provides a method of measuring parameter values from an electrical input signal, the method comprising:

detecting changes in the level of said input signal by more than a threshold amount; and operating a signal sampling device to sample said input signal in response to said signal level detector detecting a change in said input signal level by more than said threshold amount.

Preferred features are recited in the dependent claims.

Preferred embodiments of the present invention operate on an assumption that the parameters being measured generally do not change quickly with time. For example, the pressure in the tyre changes with temperature and during tyre inflation and deflation events. The rate of change of these parameters is usually a lot slower than the actual sampling frequency. In the case of tyre pressure monitoring, for example, at the start of a drive the tyres heat up, which causes the pressure inside the tyres to increase. After a period of time the temperature stabilizes and the pressure does not change very much thereafter. Therefore in a traditional TPMS where the pressure is sampled typically every 5 seconds when the vehicle is in motion, the pressure varies only by a small amount from sample to sample.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which like numerals are used to denote like parts and in which.

DETAILED DESCRIPTION OF THE DRAWINGS

Figures 1, 2:
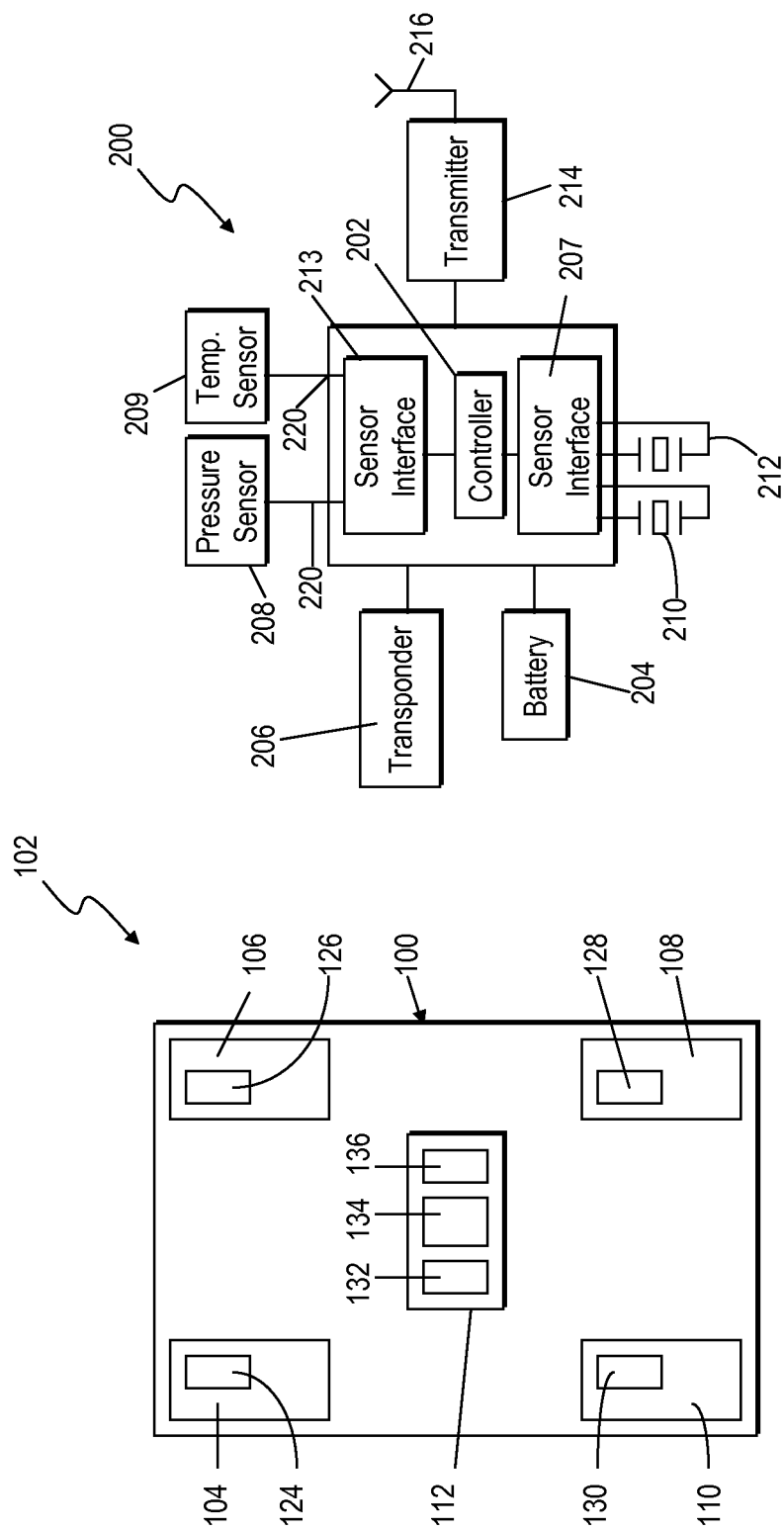
FIG. 1 is a block diagram of an embodiment of a tyre monitoring system (TMS) shown in conjunction with parts of a vehicle.
FIG. 2 is a block diagram of a tyre monitoring apparatus included in the TMS of FIG. 1.

Referring now to FIG. 1 of the drawings, there is shown, generally indicated as 102, a tyre monitoring system (TMS) shown in situ on a vehicle 100. For reasons of clarity, only those portions of the vehicle 100 and TMS 102 that are helpful in understanding the present invention are shown.

The vehicle 100 includes wheels 104, 106, 108, 110, each wheel including a tyre mounted on a rim. The TMS 102 includes a control unit 112 (such as a vehicle engine control unit (ECU), or a Body Control Module (BCM)) and tyre monitors 124, 126, 128, 130, typically generally referred to as sensors, transmitters, wheel units, or the like. The tyre monitors 124, 126, 128, 130 measure tyre characteristics, typically including tyre pressure and temperature, and transmit corresponding tyre data for reception and processing by the control unit 112. Typically, a respective tyre monitor is associated with each wheel of the vehicle 100.

In typical embodiments, the tyre monitors are capable of measuring at least tyre pressure and of transmitting data to the control unit 112, including data representing the measured tyre pressure and usually also identification information uniquely identifying the respective tyre monitor. Each of the tyre monitors 124, 126, 128, 130 includes a suitably powered wireless transmitter, conveniently a battery (or otherwise) powered radio frequency (RF) transmitter, and a pressure sensor for measuring the pressure of the gas (usually air) within the tyre. In such embodiments, the system 102 may be referred to as a tyre pressure monitoring system (TPMS).

Any suitable control unit may be used in the system 102. By way of example, in the illustrated embodiment, the control unit 112 includes a controller 132 (e.g. the vehicle ECU), a memory device 134 and a receiver 136 for receiving wireless transmissions from the tyre monitors.

Referring now to FIG. 2, there is shown a block diagram of an embodiment of a tyre monitor 200. The tyre monitor 200 includes a controller 202, a power source such as a battery 204, a transponder coil 206, a pressure sensor 208, one or more piezoelectric motion sensors 210, 212, a wireless transmitter 214 and an antenna 216. It will be apparent that the monitor 200 may use any convenient power source instead of or as well as a battery, e.g. thermoelectric and/or piezoelectric generators and/or electromagnetic induction. The tyre monitor 200 typically also includes a temperature sensor 209 for measuring the temperature of the tyre and/or of the gas within the tyre. In this illustration, the motion sensors 210, 212 each comprise a respective shock sensor of the type that produces an electrical signal in response to being subjected to acceleration (typically shock sensors are responsive to changes in acceleration, the electrical signal being indicative of, typically proportional to, the experienced acceleration or change in acceleration, especially the rate of change of acceleration). Alternatively, the sensors 210, 212 may each comprise an accelerometer or a microelectromechanical systems (MEMs) sensor. The main difference between an accelerometer and a shock sensor is that the output signal from a shock sensor is related to a change of force applied to the shock sensor, whereas the output signal from an accelerometer is proportional to the absolute force applied.

The controller 202 may be implemented by any suitable means, for example a microprocessor, microcontroller or other suitable data processing device programmed to perform the functions described herein.

In the illustrated embodiment, the pressure sensor 208 detects the pneumatic air pressure of the tyre with which the tyre monitor 200 is associated. The temperature sensor 209 measures the temperature of the tyre and/or of the air within the tyre. In alternative embodiments, the pressure sensor 208 may be supplemented with or replaced by other devices for detecting tyre data. An indication of the tyre data is provided to the controller 202 at an input 220.

A sensor interface 213 is provided between the sensors 208, 209 and the controller 202 and is configured to allow the controller 202 to measure parameter values from the electrical signals that emanate from the sensors 208, 209 during use.

A shock sensor interface 207 is provided in the tyre monitor 200 and is configured to provide the necessary control signals and detect the electrical signals from the shock sensors 210, 212.

Figure 3:
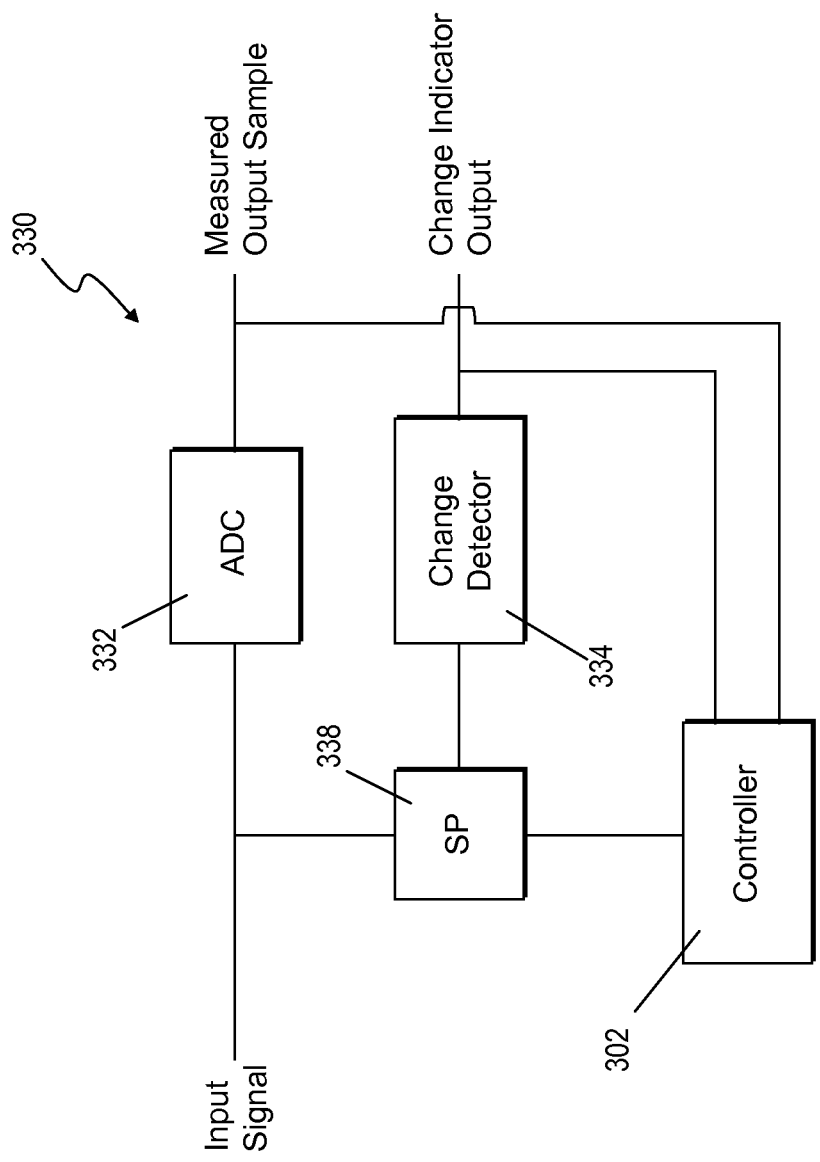
FIG. 3 is a block diagram of an apparatus for measuring parameter values from one or more electrical signals, embodying one aspect of the present invention.

Referring now to FIG. 3 of the drawings there is shown, generally indicated as 330 an apparatus for measuring parameter values from one or more electrical signals, and embodying one aspect of the present invention. The parameter values are measured by sampling the respective electrical signal at appropriate times. In preferred embodiments, the apparatus 330 is included in a wheel monitor, for example a unit the same or similar to the monitor 200, in which case it is adapted to measure parameter values representing one or more characteristics of the wheel with which it is associated, e.g. pressure, temperature, acceleration and/or battery voltage.

The apparatus 330 is arranged to receive an input signal from the respective sensor, e.g. pressure sensor 208 or temperature sensor 209, which is assumed to comprise an analogue electrical signal. The input signal typically comprises a DC signal indicative of the sensor output. A signal sampling device typically comprising an analogue-to-digital converter (ADC) 332 is provided for producing a digital output signal corresponding to the input signal. The ADC 332 is operated by a controller 302 to produce an output upon demand by the controller 302. The resulting output from the ADC 332 may be said to comprise a measured output value for the parameter represented by the input signal. Because the ADC 332 is caused to produce an output intermittently, it may be said that the input signal is being sampled. Advantageously, and as is described in more detail hereinafter, the controller 302 reduces the frequency with which the ADC 332 is required to sample the input signal in comparison with conventional sampling apparatus.

The apparatus 330 further comprises detector means 334 configured to detect changes in the input signal. Preferably, the detector 334 is configured to produce an output signal indicating when the level of the input signal changes (by increasing or decreasing in preferred embodiments) by more than a threshold amount. The threshold amount may be defined in any convenient manner, for example by one or more absolute threshold values, typically an upper threshold value and a lower threshold value, or by one or more relative threshold values (e.g. relative to an initial signal level), typically an upper and lower relative threshold value (which may or may not be the same). The detector 334 may be adjustable, for example by the controller 302, to allow the trigger threshold value(s) (upper and/or lower) to be changed. Alternatively, the trigger threshold value(s) may be fixed. In any case, the detector 334 may be said to be capable of detecting changes from a base level. Advantageously, the detector 334 is configured to produce an output signal that is indicative of whether the input signal has increased or decreased. Conveniently, the detector 334 may comprise a window comparator. In alternative embodiments, the detector may form part of or be implemented by the controller.

In preferred embodiments, a signal pre-processor 338 is provided for adjusting the input signal provided to the detector 334. In particular, the pre-processor 338 is configured to selectably introduce an adjustable offset, in particular a DC offset, to the detector 334 input signal. Conveniently, the pre-processor 338 may comprise an adjustable offset amplifier, although other means for introducing a DC offset may alternatively be used. The offset applied by the amplifier 338 is controlled by the controller 302 in response to the output of the ADC 332 and/or the detector 334, as is described in further detail below.

The controller 302 may be implemented by any suitable means, for example a microprocessor, microcontroller or other suitable data processing device programmed to perform the functions described herein. In the preferred context of a tyre monitor, the controller 202 of the tyre monitor 200 may serve as the controller 302, the other components of the apparatus 300 being included in the sensor interface 213.

The controller 302 is able to measure the input signal to the apparatus 330 from the output of the ADC 332. Typically, the controller 302 achieves this by activating the ADC 332 to sample the input signal at a selected time. However, the ADC 332 is relatively slow to operate and consumes a relatively high level of power. In contrast, the detector 334 is relatively quick to operate and consumes a relatively low level of power. In the preferred mode of operation, therefore, the controller 302 monitors the input signal by monitoring the output of the detector 334. If the output of the detector 334 indicates that there has been no significant change in the input signal, i.e. that the input signal has not changed by more than the relevant threshold amount in comparison to the last sample time, then the controller 302 determines that there is no need to activate the ADC 332 to measure the input signal. The controller 302 may then power down the apparatus 330 until the next time it is necessary to monitor the input signal. Typically, the controller 302 is configured to monitor the input signal at regular intervals defined by a sampling period (e.g. of 5 seconds). For each sampling period where the detector output indicates that there has been no significant change in the input signal, the controller 302 can wait until the next sampling period without activating the ADC 332.

When the output of the detector 334 indicates that there has been a significant change in the input signal, i.e. that the input signal has changed by more than the relevant threshold amount in comparison to the last sample time, then the controller 302 activates the ADC 332 to measure the input signal.

Typically, for example where the apparatus 330 is incorporated into a tyre monitor, it is configured to operate in the preferred mode described above after an initial settling period has elapsed since the start of a drive. Optionally, the controller 302 may operate the ADC 332 to take an initial measurement of the input signal before entering the preferred operational mode described above.

After a new measurement of the input signal has been taken, apparatus 330 is re-calibrated to adapt to the newly measured value of the input signal. The re-calibration involves adapting the operation of the apparatus 330 such that the detector 334 operates in the manner described above despite the change in input signal level, i.e. such that the detector 334 produces an output signal indicating when the level of the input signal changes by more than a threshold amount. This may be regarded as adjusting the base level of the detector 334. In the illustrated embodiment, this is achieved by causing the pre-processor 338 to introduce an offset to the signal supplied to the detector 334, the level of the offset depending on the new input signal level. In preferred embodiments, the offset is arranged to negate the effect of the newly measured input signal level on the level of the signal supplied to the detector 334, thereby maintaining the signal supplied to the detector 334 at a level that allows the detector 334 to operate in the desired manner. This approach is particularly suited to embodiments where the detector 334 comprises a window comparator, or other device, where the, or each, trigger threshold value is fixed; the amount of the offset is selected such that the input signal to the detector 334 is, after calibration, maintained at a desired level with respect to the trigger threshold value(s), e.g. at a desired level between the threshold trigger values (typically in the middle of the trigger threshold values). Typically, when the input signal level increases, the offset is negative, and when the input signal level decreases, the offset is positive.

Application of the offset by the pre-processor 338 is controlled by the controller 302, which may determine the level of offset to apply from the newly measured output from the ADC 332, or may determine it in an iterative process such as the method described hereinafter with reference to FIG. 5. More generally, the value of the offset may be determined by any convenient means. When determining the offset, it is preferred that any DC offsets introduced by the components of the apparatus 330 are eliminated or compensated for, i.e. the offset may include a component that eliminates the effect of any DC offsets caused by the apparatus 330.

In alternative embodiments, the detector 334 may have adjustable trigger threshold value(s), e.g. upper and lower trigger threshold values. In such cases, one or each the trigger threshold value may be adjusted in accordance with the change in input signal level to maintain the desired operation of the detector 334 despite the change in input signal level, e.g. to cause the new input signal level to be at the desired level (typically midway between upper and lower threshold values) with respect to the level of the trigger threshold value(s). Adjustment of the threshold(s) may be performed by the controller or by the detector, for example using the newly measured input signal value, or by an iterative process as is convenient. Alternatively still, the detector may be of a type that is responsive to relative changes in input signal level, i.e. which generates an output indicating when the input signal level has changed by more than a threshold amount from an initial level. One or more (e.g. an upper and a lower) threshold amounts may be defined as absolute or relative changes in signal level. In such cases, the initial level would typically be set to correspond with the current measured signal value and be updated when a new measurement is taken. This adjustment could be performed by the controller or the detector, as is convenient.

Figure 4:
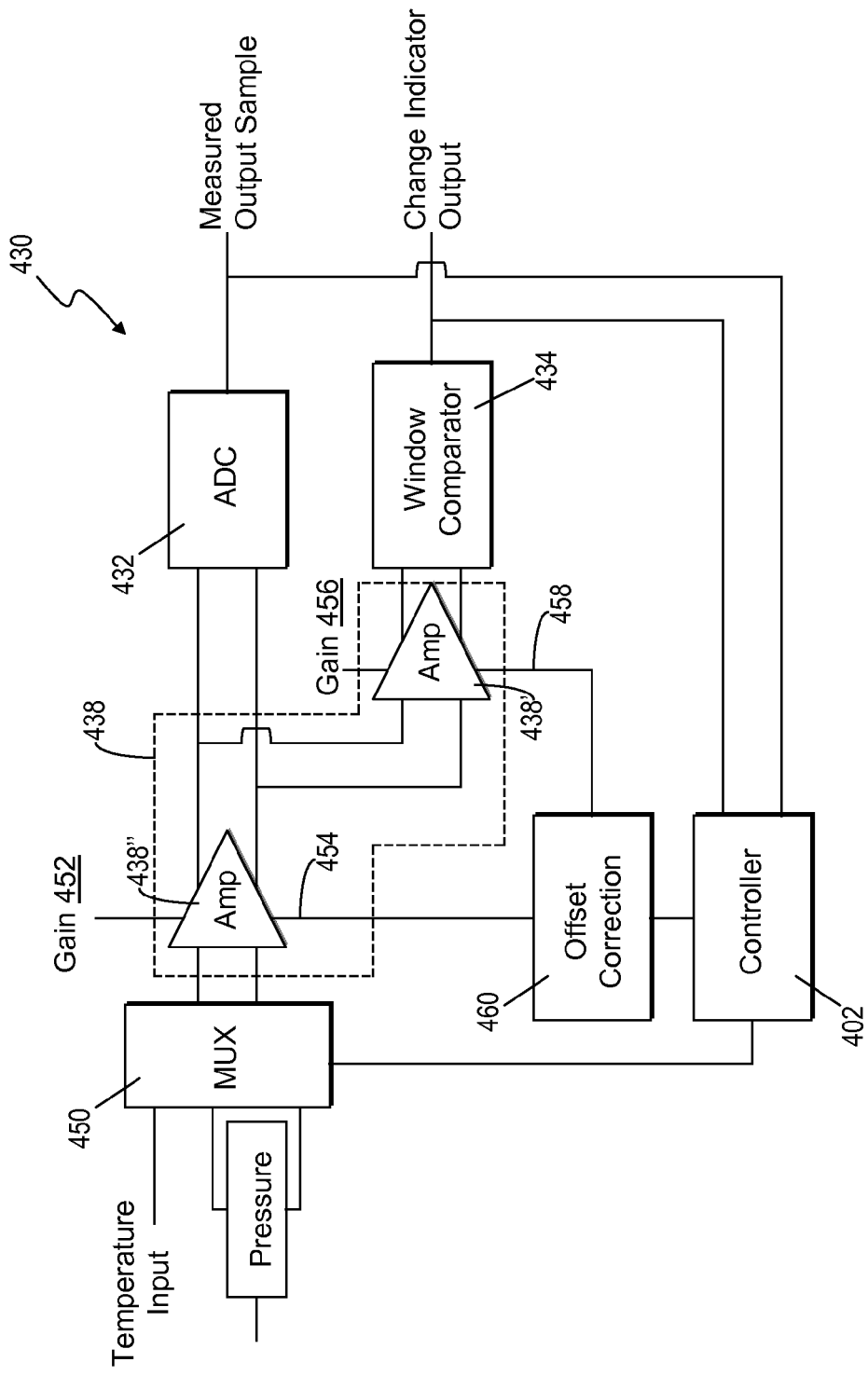
FIG. 4 is a block diagram of a preferred apparatus for measuring parameter values from one or more electrical signals, the apparatus being adapted for use in a tyre pressure monitor.

Referring now to FIG. 4 of the drawings, there is shown, generally indicated as 430, an embodiment of an apparatus for measuring parameter values from one or more electrical signals that is particularly suited for use in a tyre monitor 200. The configuration and operation of the apparatus 430 is similar to the configuration and operation of the apparatus 330 and so like numerals are used to indicate like parts and similar descriptions apply as would be apparent to a skilled person.

The apparatus 430 is assumed by way of example to be capable of monitoring two parameters, namely pressure and temperature, of a vehicle tyre (not shown) from respective input signals emanating from respective sensors, e.g. the sensors 208, 209 of tyre monitor 200. The apparatus 430 is operable to sample a selected one of its input signals at a time and, to this end, includes an input multiplexer 450, or other suitable switching device, which may conveniently be controlled by controller 402. In FIG. 4, the temperature input is assumed to comprise a simple DC signal while the pressure input is assumed to comprise a differential input signal (and so the circuit of FIG. 4 is shown as a differential circuit), although this is not limiting to the invention.

In the embodiment of FIG. 4, the signal pre-processor 438 is provided in two parts, namely a first part 438' which is incorporated into the circuit at the input to the detector 434, and a second part 438" which is incorporated into the circuit at the input to the ADC 432, and such that the two parts 438', 438" are capable of providing a cumulative offset to the input to the detector 434. The first and second parts 438', 438" may be arranged to implement a respective part of the offset, the overall effect being the same as described above in relation to FIG. 3.

The first part 438' of the signal pre-processor 438 conveniently comprises an amplifier, for example a programmable gain amplifier. Typically, the gain of the amplifier 438' is adjustable and to this end the amplifier 438' has a gain adjust input 456. Conveniently, the gain of the amplifier is adjusted by the controller 402, for example during calibration of the apparatus 430. The amplifier 438' preferably also has an offset control input 458 by which the amplifier 438' can be caused to apply an offset to its input signals. The second part 438" conveniently also comprises an amplifier, for example an instrumentation amplifier. Typically, the gain of the amplifier 438" is adjustable and to this end the amplifier 438" has a gain adjust input 452. Conveniently, the gain of the amplifier is adjusted by the controller 402, for example during calibration of the apparatus 430. The amplifier 438" preferably also has an offset control input 454 by which the amplifier 438" can be caused to apply an offset to its input signals.

The ADC 432 preferably comprises a sigma delta ADC, although other types of ADC could alternatively be used. The detector 434 preferably comprises a window comparator.

The controller 402 typically comprises a suitably programmed microprocessor or microcontroller. In order to implement offsets in response to changes in the input signal level, the controller 402 includes or is otherwise co-operable with an offset correction module 460, which may comprise one or more offset correction digital-to-analogue (DAC) converters.

In the following description, it is assumed for the purpose of illustration that the apparatus 430 is intended for measuring tyre pressure or temperature, although it will be understood that the invention is not limited to this.

During typical use, the apparatus 430 initially activates the pressure sensor (or other sensor), amplifiers 438', 438" and window comparator 434. The apparatus 430 then allows a period of time for the input signal received from the sensor to settle. Next, the apparatus 430 examines the output from the window comparator 434. If the tyre pressure or temperature has not changed, or has changed by an amount small enough to be deemed insignificant e.g. less than a threshold amount, then the input signal level received by the apparatus 430 will not have changed, or will have changed by a correspondingly small amount, and there will be no output from the window comparator 434 (or an output indicating that there has been no significant change). Whether or not a change is regarded as insignificant is determined by the operating parameters, e.g. the, or each, trigger threshold, of the window comparator 434. If no significant change in input signal level is detected, then the apparatus 430 may be powered down until required again, e.g. during the next sampling period.

If the pressure or temperature has changed significantly, e.g. by more than a threshold amount or going beyond one or more threshold values, then the window comparator 434 indicates this by its output signal. The controller 402 monitors the output of the comparator 434 to determine whether or not the input signal level has changed significantly. The output of the comparator 434 can indicate that there is a significant change but does not indicate the extent of this change. Therefore, the apparatus 430, and in particular the controller 402, operates the ADC 432 to accurately measure the new pressure or temperature.

When the new pressure or temperature has been measured by the ADC 432, then the apparatus 420, and in particular the operation of the window comparator 434, is calibrated to the new input signal level. This may be achieved by monitoring the output of the window comparator 434 to determine if the input signal level has increased or decreased. In the illustrated embodiment, the controller 402 implements the offset in conjunction with offset correction DAC 460 in order to negate the newly measured absolute temperature or pressure DC value, and advantageously to remove any DC offsets introduced by the apparatus 430.

In the preferred embodiment, when the apparatus 430 has been calibrated correctly, then the input signal being applied to the window comparator 434 is substantially centrally located within the window defined by the comparator 434, the offset DAC 460 having compensated for the newly measured signal level and preferably also any system DC offsets.

Figure 5:
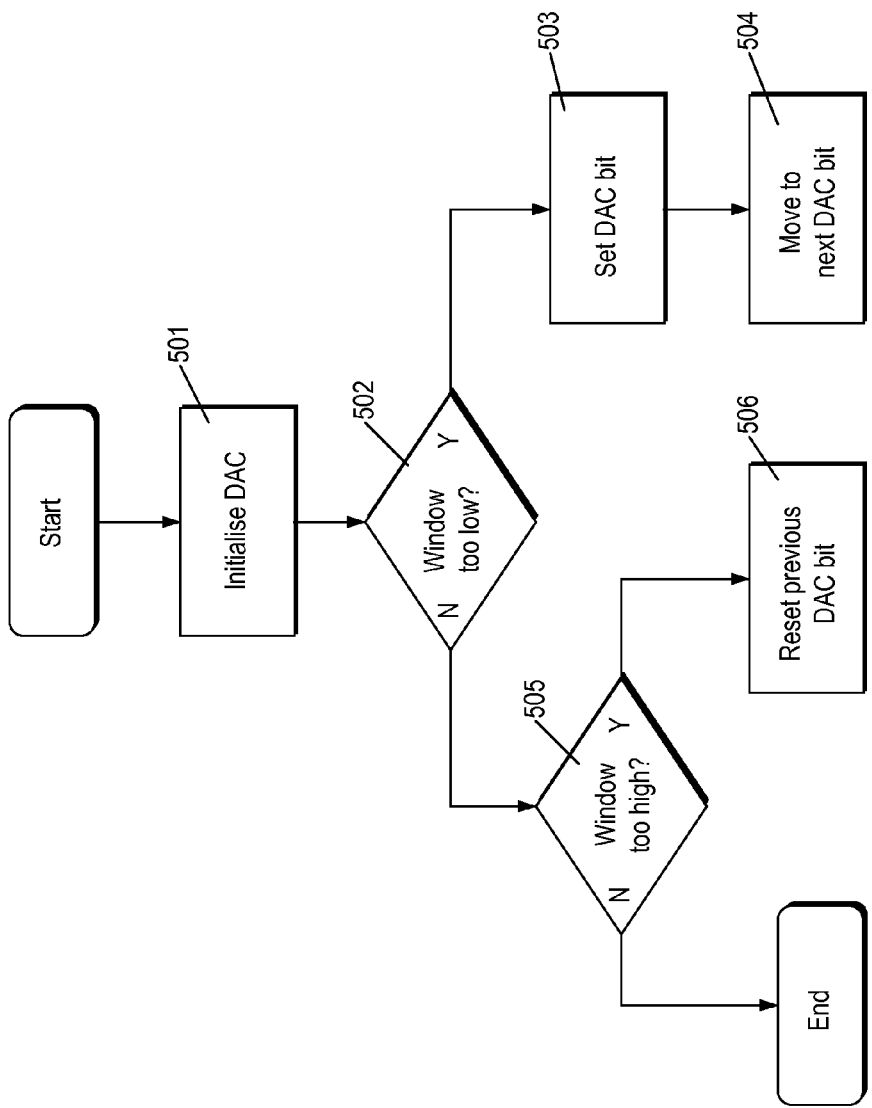
FIG. 5 is a flowchart illustrating a preferred method of calibrating the apparatus of FIG. 3 or FIG. 4.

Referring now to FIG. 5 of the drawings, there is described a preferred calibration method, involving implementation of the offset, the method being suitable for performance by the controller 402 in conjunction with the DAC 460. At the start of the calibration process, the DAC 460 is initialized, which typically involves setting it to zero (501). The controller 402 then determines if the output of the window comparator 434 indicates that the input to the comparator 434 is beyond one or the other (i.e. upper or lower) trigger thresholds (502), i.e. lies outside of the window defined by the comparator 434 (which should be the case during at least the first iteration of the calibration).

At step 503, the controller 402 configures the DAC 460 to cause it to apply an offset. In the preferred embodiment, this involves setting or resetting one or more bits of the DAC, the output of the DAC corresponding to how the bit(s) are configured. For example, for a 6 bit DAC the setting 000000 may correspond to no offset while 111111 may correspond to maximum offset. The controller 402 causes the DAC 460 to apply a positive offset if the input level is below the lowest trigger threshold, and a negative offset if the input level is above the highest trigger threshold.

During the first iteration of calibration, if it is determined that the threshold is exceeded at step 502, then the controller 402 sets the DAC 460 at step 503 to apply an initial offset to the comparator input signal. In subsequent iterations, at step 503 the controller 402 adjusts the configuration of bits to adjust the level of offset. In each case, after step 503, step 502 is performed to check if the applied offset has brought the input signal level at the comparator 434 within the originally exceeded threshold (i.e. above the lower threshold or below the upper threshold, as applicable). If not, then step 503 is repeated. If at step 502 it is determined that the originally exceeded threshold is no longer exceeded (i.e. that the signal level is now above the lower level or below the upper level), then the controller 402 checks (505) if the input signal level has been offset to such an extent that it is now beyond the other threshold (i.e. above the upper level or below the lower level). If it has, then the controller 402 configures the DAC to reduce the level of offset (506). The controller then returns to step 502. The coarse calibration is complete once it has been determined that the input signal to the comparator is between the upper and lower thresholds.

In the preferred embodiment, the controller sets a single bit of the DAC 460 in step 503 and, after step 503, a bit index is adjusted (504) to indicate a different bit such that respective different bits are set with each iteration of step 503. Conveniently, the arrangement is such that the most significant bit is set first (i.e. during the initial iteration) and in each subsequent iteration the next most significant bit is set. In step 506, the most recently set bit is reset.

It is preferred also to perform a fine calibration in order to set the comparator input signal level to a desired position between the thresholds, e.g. in the centre. Starting from the DAC setting found by coarse calibration, the controller 402 adjusts the DAC configuration to, in a plurality of iterations, increase and decrease the offset while monitoring the comparator output until the upper and lower trigger thresholds are found. The controller 402 may then configure the DAC 460 using the bit configuration that is mid-way between the respective bit configurations that correspond to the upper and lower thresholds.

In alternative embodiments, the controller may calculate a configuration for the DAC based on the measured signal level from the ADC output, optionally fine tuning the configuration in the manner described above.

At the end of calibration the selected offset is dependent on the newly measured signal level, but is not necessarily calculated from it.

In the preferred embodiment, the offset is implemented by two amplifiers 438', 438" each configured by a respective DAC under the control of the controller 402. If calibration can be completed using only one amplifier and its respective DAC, then the other need not be used. Alternatively, a single DAC may be use to set the offset of both amplifiers 438', 438".

Ideally, the window comparator 334, 434 should comply with the same specification as the ADC 332, 432 and this may be achieved by an initial calibration, conveniently performed at the time of production of the apparatus 330, 430 or tyre monitor 200. The initial calibration is performed when the pressure, or other, sensor is connected to the apparatus 330, 430. The initial calibration accounts for part to part variations in the apparatus 330, 430 or monitor 200, for example part to part variations of the pressure sensors and/or part to part variation of the ASIC measurement system (assuming that the monitor 200 or other device into which the apparatus 330, 430 is incorporated is implemented in an ASIC).

Typically, a standard pressure (or other parameter being measured) calibration is performed, e.g. by connecting the apparatus 330, 430 to a known pressure or temperature source, at the time of production to set up the gain of the amplifier 438" and configure the slope of the ADC 432. Once this has been completed then an extra step takes place, namely to adjust the gain of the amplifier 438' so that the pressure or temperature slope is set such that causes the window comparator 434 to trigger in response to the desired change in input signal level.

In typical tyre monitoring systems, significant changes in pressure or temperature occur in less than 10% of sampled measurements, and this means that the ADC 432 is expected to be used by the apparatus 430 for less than 10% of measurements. This results in a significant saving in battery energy when compared to conventional tyre monitoring systems since the window comparator 434 is much quicker than the ADC 432 and so the apparatus 430 will require power for less time, and because the ADC 432 requires significantly more current than the window comparator.

Advantageously, embodiments of the invention exhibit a reduced requirement to perform full ADC cycles every time a sample is required. This means that the current consumption is significantly reduced.

It will be apparent that preferred embodiments of the invention significantly reduce the power consumption required to measure tyre parameters. This allows tyre sensor designs that are weight critical to move to smaller and lighter battery technology. Size reduction can also be achieved, which results in lower material costs.

The invention is not limited to the embodiments described herein, which may be modified or varied without departing from the scope of the invention.

The invention claimed is:

1. An apparatus for measuring parameter values from an electrical input signal, the apparatus configured to obtain a respective parameter value for each of a plurality of sampling periods, and the apparatus comprising:
   a signal sampling device operable to sample said input signal and to produce a corresponding output comprising a measured parameter value;
   a signal level detector configured to detect changes in the level of said input signal by more than a threshold amount; and
   a controller co-operable with said signal sampling device and said signal level detector and being configured to operate said signal sampling device to sample said input signal in response to said signal level detector detecting the changes in said input signal level by more than said threshold amount, wherein, for sampling periods in respect of which said signal level detector detects a change in said input signal level by more than said threshold amount, said controller is configured to obtain said respective parameter value by operating said signal sampling device to sample said input signal, and for sampling periods in respect of which said signal level detector does not detect a change in said input signal level by more than said threshold amount, said controller is configured to use a previously obtained parameter value as said respective parameter value.

2. The apparatus as claimed in claim 1, wherein said previously obtained parameter value comprises the respective parameter value obtained for the previous sampling period.

3. The apparatus as claimed in claim 1, wherein said signal level detector is configured to detect said changes in the level of said input signal with respect to a base level, and wherein after causing said signal sampling device to sample said input signal, said controller is configured to recalibrate said apparatus such that said base level is adjusted.

4. The apparatus as claimed in claim 3, wherein said recalibration involves adjusting said base level by an amount determined by the detected changes in the level of said input signal.

5. The apparatus as claimed in claim 4, wherein said recalibration involves adjusting said base level by an amount of substantially equal magnitude and opposite sense to the detected changes in the level of said input signal.

6. The apparatus as claimed in claim 3, wherein said controller is configured to cause a DC offset to be applied to said input signal level in order to adjust said base level.

7. The apparatus as claimed in claim 6, wherein the amount of said DC offset is determined by the detected changes in the level of said input signal.

8. The apparatus as claimed in claim 7, wherein the amount of said DC offset is of substantially equal magnitude and opposite sense to the detected changes in the level of said input signal.

9. The apparatus as claimed in claim 6, further including signal processing circuitry arranged to supply said input signal to said signal level detector and being configured to apply an adjustable DC offset to said input signal under the control of said controller.

10. The apparatus as claimed in claim 9, wherein said signal processing circuitry comprises at least one amplifier.

11. The apparatus as claimed in claim 10, wherein said signal processing circuitry comprises a plurality of amplifiers, wherein the amplifiers are arranged in series with one another, each being configurable to apply a respective portion of said DC offset to said input signal.

12. The apparatus as claimed in claim 6, wherein said controller is arranged to determine the amount of said DC offset by an iterative process in which said controller causes an initial DC offset to be applied and subsequently adjusted until said input signal level is above a lower threshold level and below an upper threshold level.

13. The apparatus as claimed in claim 12, wherein, after said iterative process, said controller is arranged to further adjust the amount of said DC offset until said signal level detector detects that said DC offset meets said lower threshold level or meets said upper threshold level, and to select the amount of said DC offset by averaging the subsequently adjusted DC offsets that cause said signal level detector to detect that said DC offset meets said upper threshold level or said lower threshold level.

14. The apparatus as claimed in claim 12, wherein said controller is configured to control said signal processing circuitry using at least one digital-to-analogue converter (DAC) by configuring input bits of said at least one DAC to produce an output signal indicative of the amount of said DC offset, said output signal being supplied in use to said signal processing circuitry.

15. The apparatus as claimed in claim 14, wherein said controller is configured to implement said iterative process by, starting with the most significant bit of said DAC, setting successive bits of said at least one DAC one at a time until a detected change in said input signal level is above said at least one threshold amount.

16. The apparatus as claimed in claim 15, wherein said controller is further configured to, when adjusting said DC offset in respect of one of said upper and lower threshold levels, reset the most recently set bit of said at least one DAC upon determining that said input signal level is below said lower threshold level or above said upper threshold level.

17. The apparatus as claimed in claim 6, wherein said controller is arranged to determine the amount of said DC offset from the value of said sampled input signal.

18. The apparatus as claimed in claim 3, wherein said controller is arranged to determine by how much to adjust said base level from the value of said sampled input signal.

19. The apparatus as claimed in claim 1, wherein said signal level detector is configured to detect when said input signal level is below a lower absolute threshold level or above an upper absolute threshold level.

20. The apparatus as claimed in claim 19, wherein said controller is configured to recalibrate said apparatus by adjusting said at least one absolute threshold level.

21. The apparatus as claimed in claim 1, wherein said signal level detector is configured to detect when said input signal level is below a lower relative threshold level or above an upper relative threshold level.

22. The apparatus as claimed in claim 1, wherein said signal level detector comprises a window comparator.

23. The apparatus as claimed in claim 1, wherein said signal sampling device comprises an analogue-to-digital converter (ADC).

24. A tire monitoring apparatus comprising an apparatus for measuring parameter values from an electrical input signal, the apparatus for measuring parameter values configured to obtain a respective parameter value for each of a plurality of sampling periods and, the apparatus for measuring parameter values from said electrical input signal comprising:
    a signal sampling device operable to sample said input signal and to produce a corresponding output comprising a measured parameter value;
    a signal level detector configured to detect changes in the level of said input signal by more than a threshold amount; and
    a controller co-operable with said signal sampling device and said signal level detector and being configured to operate said signal sampling device to sample said input signal in response to said signal level detector detecting a change in said input signal level by more than said threshold amount, wherein, for sampling periods in respect of which said signal level detector detects a change in said input signal level by more than said threshold amount, said controller is configured to obtain said respective parameter value by operating said signal sampling device to sample said input signal, and for sampling periods in respect of which said signal level detector does not detect a change in said input signal level by more than said threshold amount, said controller is configured to use a previously obtained parameter value as said respective parameter value.

25. The tire monitoring apparatus as claimed in claim 24, wherein said electrical input signal is derived from at least one sensor for monitoring at least one characteristic of said tire, wherein the monitored at least one characteristic comprises the pressure and/or temperature of the tire.

26. A method of measuring parameter values from an electrical input signal, the method comprising:
    detecting changes in the level of said input signal by more than a threshold amount;
    operating a signal sampling device to sample said input signal in response to a signal level detector detecting a change in said input signal level by more than said threshold amount; and
    obtaining a respective parameter value for each of a plurality of sampling periods,
    wherein, for sampling periods in respect of which said signal level detector detects a change in said input signal level by more than said threshold amount, obtaining said respective parameter value by operating said signal sampling device to sample said input signal, and for sampling periods in respect of which said signal level detector does not detect a change in said input signal level by more than said threshold amount, using a previously obtained parameter value as said respective parameter value.

* * * * *